(12) United States Patent
Jarrett, Jr.

(10) Patent No.: US 6,747,368 B2
(45) Date of Patent: Jun. 8, 2004

(54) WIRELESS CONTROL OF POWER TRANSFER SWITCHES FOR ELECTRICAL LOAD MANAGEMENT

(76) Inventor: Harold M. Jarrett, Jr., 4567 Bogie Rd., Duluth, GA (US) 30096

( * ) Notice: Subject to any disclaimer, the term of this patent is extended or adjusted under 35 U.S.C. 154(b) by 394 days.

(21) Appl. No.: 09/943,278

(22) Filed: Aug. 30, 2001

(65) Prior Publication Data

US 2003/0042794 A1 Mar. 6, 2003

(51) Int. Cl.$^7$ ............................................... H02J 1/00
(52) U.S. Cl. ...................................................... 307/31
(58) Field of Search ............................. 307/29, 31, 39, 307/113, 116, 125, 32–34, 70; 700/295

(56) References Cited

U.S. PATENT DOCUMENTS 6,583,521 B1 * 6/2003 Lagod et al. .................. 307/70

* cited by examiner

Primary Examiner—Gregory J. Toatley
(74) Attorney, Agent, or Firm—Kenneth W. Float

(57) ABSTRACT

Methods and apparatus that couple standby power to certain non-critical loads to implement load reduction and avoid power shortages and resultant blackouts. A primary power source is coupled to an electrical breaker panel that distributes power to a plurality of loads including non-critical loads, critical loads, and load reduction loads. A secondary power source is coupled to an automatic transfer switch that distributes power to the critical loads from the secondary power source if power is not available from the primary power source. A load reduction transfer switch, wired in parallel to the automatic transfer switch, distributes power from the secondary power source to the load reduction loads to reduce power demand on the primary source only when power from the primary power source is available and during times requiring load reduction. Preferably, the load reduction transfer switch is wirelessly controlled to permit simultaneous load reduction at multiple sites.

20 Claims, 4 Drawing Sheets

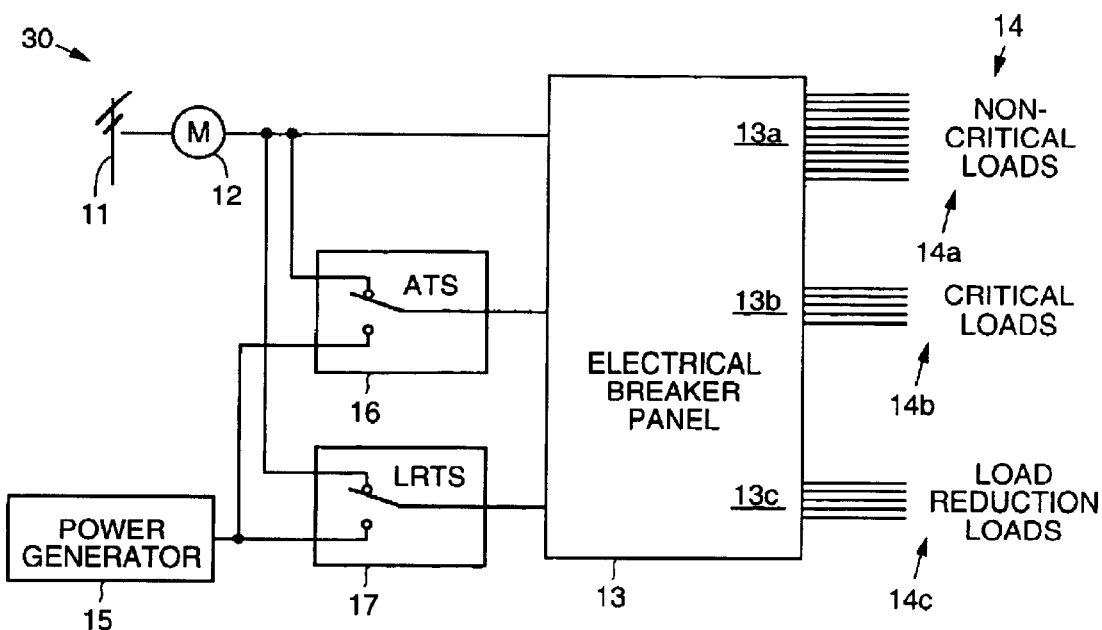
Fig. 3
Fig. 4
(PRIOR ART)
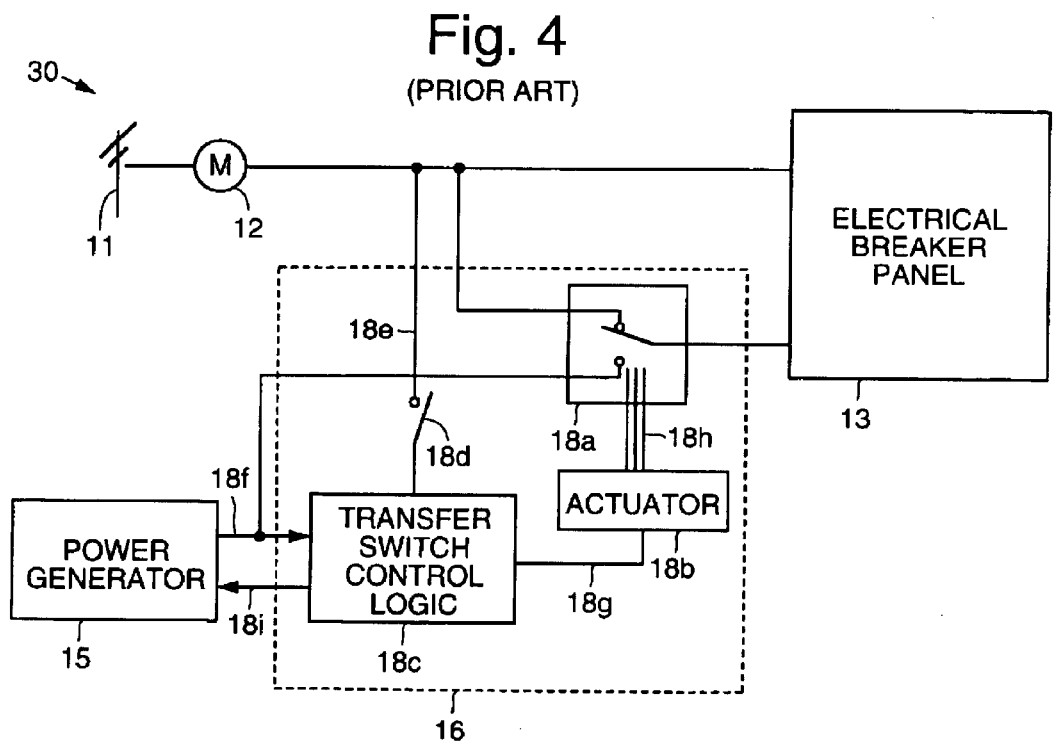

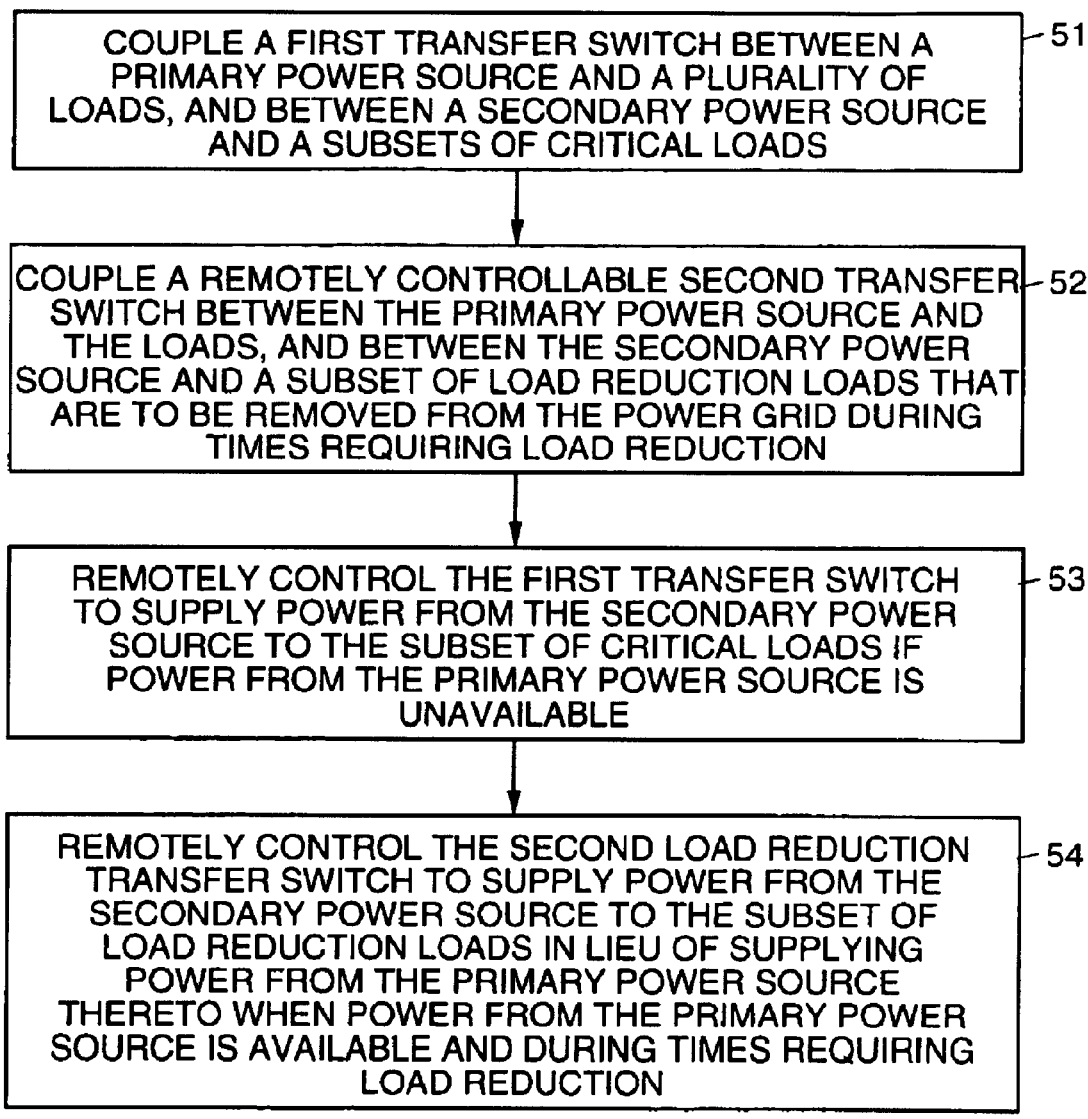

WIRELESS CONTROL OF POWER TRANSFER SWITCHES FOR ELECTRICAL LOAD MANAGEMENT

BACKGROUND

The present invention relates generally to power control systems, to wireless control of electric power transfer switches, and more particularly, to designs of secondary transfer switches that allow a generator or other secondary power source to supply power to certain loads in order to reduce the electric power drawn from a primary source of power such as the utility grid.

The use of generators for backup power in the event of loss of utility grid power has been broadly accepted for decades. In recent years, the reciprocating engine-driven generators have been complemented by gas turbine engines, solar collectors, uninterruptible power system (UPS) devices and fuel cells as secondary sources of power. In typical applications, certain electric circuits that power critical equipment such as computer networks, emergency lighting, fire equipment, and the like have been "backed up" by the standby or emergency power sources. In general, a user of standby power buys a standby system that is powerful enough to supply power for the critical loads mentioned, but not large enough to power an entire building or business. The size of the standby power source chosen is generally a financial decision, weighing the cost of the equipment against the probability of financial loss caused by a power outage, and the likelihood of such outage. In general, such machines are not marketed with the intent of their being used for primary power production. While a certain percentage of generators are used to provide power back onto the utility grid, this process is relatively rare and requires very expensive control equipment, generally called switch gear.

The typical emergency standby power generator is used to provide power to the critical loads within a building, on the consumer side of the utility meter, through a device known as an automatic transfer switch (ATS). The automatic transfer switch operates so as to connect the critical loads to the utility grid power when such power is present and available, but it senses the loss of utility power (outage) and provides a signal to start up the standby generator. When the generator has achieved the specified stable voltage and frequency, the transfer switch automatically disconnects the critical loads from the utility power source and reconnects them to the generator power. At such time as utility power becomes available, the automatic transfer switch reconnects the critical loads to the utility source. There is a wide range of sizes and features among transfer switches, but virtually all standby power generator connections follow the basic concept outlined above.

In the United States, there are at least 500,000 standby power generators in place, averaging about 100,000 watts of standby power each. This represents 50 Billion watts of available power sitting idle 99% of the time. This amount of power is as large as even the largest utilities, and could, if put into production, provide a significant solution to peak power shortages that utilities are experiencing. Unfortunately the current concept of providing standby power to critical loads is in conflict with the concept of using the machines for load reduction by transferring generator power to non-critical loads such as lighting and air conditioning which represent a good target for load reduction programs, either internally financially motivated, voluntary or utility mandated. It is considered unwise to power the critical loads by generator, and thus the current standby power paradigm does not support ready application of standby power in the load reduction application.

It is therefore an objective of the present invention to provide for methods and apparatus for making existing standby power available for use in load reduction programs to assist utilities in avoiding power shortages and resultant blackouts and to reduce consumer power costs during peak demand times.

SUMMARY OF THE INVENTION

To accomplish the above and other objectives, the present invention provides for methods and apparatus that are operative to couple standby power to certain non-critical loads that implement load reduction to assist utilities in avoiding power shortages and resultant blackouts. In implementing the present invention, a secondary transfer switch, referred to as a load reduction transfer switch (LRTS), is connected between a standby or secondary power source or generator and selected non-critical loads that may be safely powered by the secondary power source or generator.

An exemplary utility electrical distribution system comprises a primary utility source coupled to an electrical breaker panel that distributes power to a plurality of loads comprising non-critical loads, critical loads, and load reduction loads. A secondary power source is coupled to an automatic transfer switch that distributes power to the critical loads from the secondary power source if power is not available from the primary utility source. A load reduction transfer switch, wired in parallel to the automatic transfer switch, distributes power to the load reduction loads to reduce power demand on the primary utility source so long as the primary source is available.

An exemplary method that implements load reduction is used in a system that supplies power from a primary power source on a power grid to multiple sets of loads. The exemplary method comprises the following steps. A first transfer switch is coupled between one or more secondary power sources and one or more corresponding subsets of critical loads. Each first transfer switch is remotely controlled to supply power from the associated secondary power source to the corresponding subset of critical loads if power from the primary power source is unavailable. A remotely controllable load reduction transfer switch is coupled between each secondary power source and a subset of load reduction loads that are to be removed from the power grid during times requiring load reduction. Each load reduction transfer switch is remotely controlled to supply power from the secondary power source to its corresponding subset of load reduction loads in lieu of supplying power from the primary power source only when power from the primary power source is available and during times requiring load reduction.

The load reduction transfer switch may be installed in the same housing as a conventionally-used automatic transfer switch in new equipment production. However, in retrofit applications, a separate secondary load reduction transfer switch represents a simpler solution. In both cases, the load reduction transfer switch and the automatic transfer switch are connected in parallel to a utility power source, and the generator, or other secondary power source, and they both provide the switched power to appropriate loads; critical loads are connected to the automatic transfer switch and non-critical load reduction loads are connected to the load reduction transfer switch.

In general, the transfer switches are wired, however, so that the load reduction transfer switch and automatic transfer switch cannot both connect their loads to the secondary generator simultaneously, unless the secondary generator is sized for this application. In general, the load reduction transfer switch only operates when utility power is present and available, and the automatic transfer switch only operates when the utility power is absent. This logic is consistent with the design of the secondary generator, the transfer switches, and the chosen loads.

A wireless connection to the load reduction transfer switch may be used to provide a logical command to the load reduction transfer switch to initiate generator operation and to transfer power to the load when the generator has achieved stable operation. The application of the logic signal may be logically ANDed with a logic signal representing "utility grid power available". Thus, if the command is received and grid power is present, the command to the load reduction transfer switch would be applied. If the command is received and no grid power is available, then the load reduction transfer switch is not commanded into operation, because the generator may be in operation supporting critical loads, and the critical loads carry priority over load reduction requirements. At the end of the load reduction process, the transfer command logic signal is removed from the load reduction transfer switch, generator power is disconnected from the load reduction loads, and utility power is restored to these loads.

Prior to executing the transfer of loads to the generator, the control logic may provide a logic signal that "notifies" the loads of an upcoming power disturbance during the transfer process. For example, if the load is an air conditioning system, the control logic may open a relay in the thermostat circuit, allowing air conditioning blowers and pumps to come to a halt under their standard timing. This avoids the likelihood of inducing power spikes into the equipment during the transfer process. These power quality problems at transfer time, especially in "open transition" transfer switches represent one of the primary impediments to the use of standby power generators in load reduction programs. That is, the potential for financial loss due to equipment damage by power surges may seem to be a greater risk than the value of the savings in power costs associated with the load reduction program incentives. Thus, the ability to "power down" loads prior to transfer is an important aspect of the present invention.

The present invention is described in the context of wireless connectivity, although wired connection may readily be implemented. The preference for wireless connections comes from the ability to command large numbers of remote machines simultaneously via wireless communication, while achieving this function with telephone line connections is difficult, slow, and expensive. Further, the ability to install the load reduction transfer switch on existing generators without having to coordinate with local telephone providers is a major advantage of wireless connectivity. In order to match the wireless methods and capabilities in the area of broadcast control of multiple machines, a wire line connection would typically have to be configured into a computer network connection, and this further adds to cost and complexity.

Also, the controller may optionally measure the local load at the location of the electrical breaker panel, and automatically transfer load to the secondary generator via the load reduction transfer switch if customer demand approaches a threshold that would adversely affect the electricity bill. Industrial customer rates are commonly set by their peak demand, and this is why utilities monitor them on a 15 minute interval. The present invention thus may be used to minimize usage of the utility service in order to minimize electricity bills. Thus, the present invention not only provides for wired and wireless control of load switching, but also provides for automatic transfer of power to the secondary generator if customer demand approaches a threshold that would increase a customer's bill. To implement this, the logic in the controller includes a customer demand threshold, that, when reached, causes the controller to switch the load reduction loads to the secondary generator.

Furthermore, the present invention not only provides for wired and wireless control of load switching, but also provides for automatic transfer of power to the secondary generator if customer demand approaches a threshold that would increase a customer's bill. Multiple-pole load reduction transfer switches and associated control circuit may be employed to know or sense the difference between power-out and peak power reduction needs, and automatically connect the proper load to the secondary power source. The use of multiple-pole load reduction transfer switches addresses local measurement of power and automatic switching to reduce the need for utility power during high customer demand situations.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 3 illustrates a flow diagram of a utility electrical distribution system comprising a load reduction transfer switch installation in accordance with the principles of the present invention;

FIG. 4 illustrates a flow diagram of typical transfer switch control logic;

FIG. 7 is a flow diagram illustrating an exemplary method in accordance with the principles of the present invention.

DETAILED DESCRIPTION

Figure 1:
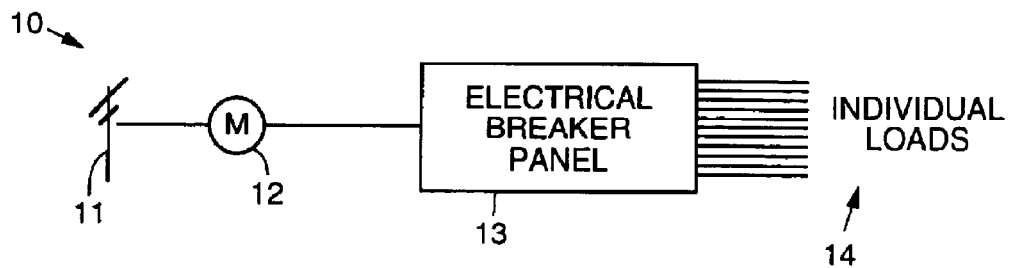
FIG. 1 illustrates a flow diagram of a basic utility electrical distribution system.

Referring to the drawing figures, FIG. 1 illustrates a flow diagram of a basic utility electrical distribution system 10. The utility electrical distribution system 10 delivers electrical power from a primary utility source 11, or utility provider 11, through a utility power meter 12, to an electrical breaker panel 13 that distributes power to individual loads 14, such as motors, lighting, air conditioning systems, and the like. In FIG. 1, the only source of power is the utility provider 11, and loss of power from the utility source 11 leaves consumers without power to operate electrical equipment loads 14.

Figure 2:
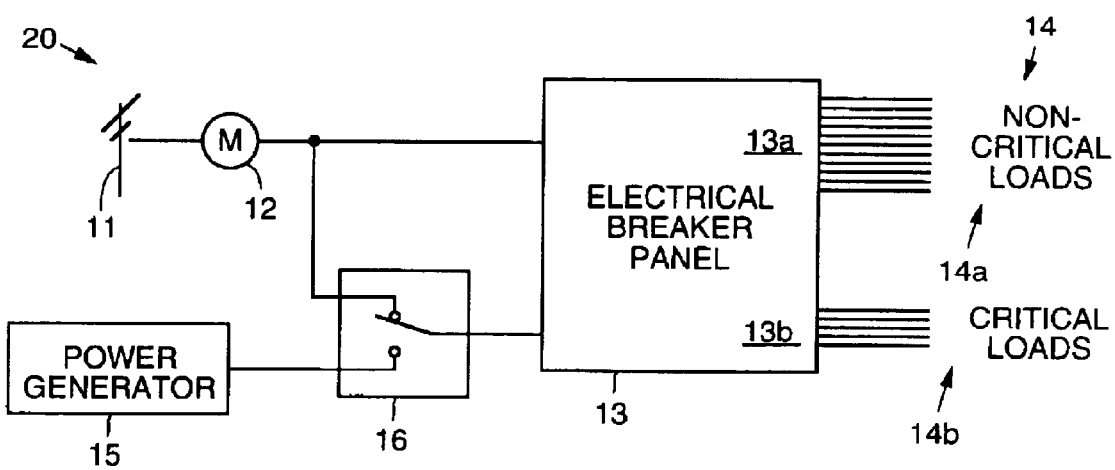
FIG. 2 illustrates a flow diagram of a simple standby power electrical system.

To address the problem of loss of power to critical electrical equipment, certain machines have been developed to provide standby emergency power in those instances, and FIG. 2 shows an example of this application. In FIG. 2, certain electrical loads 14 that are considered "critical loads" 14b, are segregated from those that are non-critical loads 14a serviced by the distribution panel 13.

The critical loads 14b are connected to an automatic transfer switch (ATS) 16 which comprises a two position relay that selectively connects the critical loads 14b either to the primary utility source 11 or a secondary or standby power source 15 or standby power generator 15. The standby power source 15 is typically a mechanical generator, but it may be a fuel cell or battery power source.

If power is lost from the primary utility source 11, the transfer switch 16 can connect the critical loads 14b to receive electrical power generated by the standby power generator 15. The automatic transfer switch 16 generally includes control functionality that allows transfer of the critical loads 14b from the primary utility source 11 to the secondary or standby power source 15 automatically in the case of loss of voltage from the primary utility source 11.

Referring now to FIG. 3, it illustrates a utility electrical distribution system 30 in accordance with the principles of the present invention. The present utility electrical distribution system 30 is configured in the manner as the system 20 shown in FIG. 2, but further comprises a second transfer switch 17, referred to as a load reduction transfer switch (LRTS) 17, wired in parallel to the automatic transfer switch 16.

In addition, certain electrical loads designated "load reduction loads" 14c are further segregated from the critical and non-critical loads 14b, 14a. The load reduction loads 14c are specifically chosen based on certain criteria such as high energy consumption and tolerance to low power quality. The load reduction loads 14c are targeted for removal from the primary utility source 11 to reduce peak demand on the utility.

The load reduction transfer switch 17 is designed so that it cannot normally connect the standby power generator 15 to the load reduction loads 14c in the absence of utility power, while the automatic transfer switch 16 is designed to connect its critical loads 14b to the standby power generator 15 only in the absence of utility power. Thus, the operation of the automatic transfer switch 16 and load reduction transfer switch 17 are typically mutually exclusive.

This mutual exclusivity may be avoided if the standby power generator 15 is powerful enough to carry both the critical and load reduction loads 14b, 14c simultaneously. A benefit of the load reduction transfer switch 17 is that it allows the standby power generator 15 to power the load reduction loads 14c while utility power is available, and independently from the critical loads 14b that are powered by the same machine in the case of loss of utility power.

FIG. 4 shows a schematic representation of control logic 18 used with a typical automatic transfer switch 16. Electrical power is provided to the breaker panel 13 via a two position contactor 18a. In one position of the two position contactor 18a, the breaker panel 13 is connected to the primary utility source 11. In the other position of the two position contactor 18a, the breaker panel 13 is connected to the standby power generator 15 or secondary power source 15.

The automatic transfer switch 16 is controlled by a transfer switch control logic circuit 18c that performs the following functions. Firstly, the transfer switch control logic circuit 18c senses the presence or absence of utility voltage 18e. If the utility voltage 18e is lost, the transfer switch control logic circuit 18c then provides a start signal 18i to the standby power generator 15, causing it to begin producing power.

Secondly, the automatic transfer switch 16 monitors power 18f produced by the standby power generator 15, and when that output reaches a stable voltage and frequency, the automatic transfer switch 16 initiates transfer of power to the loads 14a, 14b from the utility source 11 to the standby power generator 15.

Thirdly, to cause the power transfer, the transfer switch control logic circuit 18c generates a control signal 18g that drives an actuator 18b. The actuator 18b may be electromagnetic, motor operated, or otherwise connected to the contactor 18a through force 18h. At such time as the power transfer is no longer needed, the actuator 18b is reset to its original condition by the control logic circuit 18c. On most transfer switches 16, a manual transfer control switch 18d is included. The manual transfer control switch 18d removes utility voltage 18e from the input to the control logic circuit 18c, tricking it into executing the operation described above.

Figure 5:
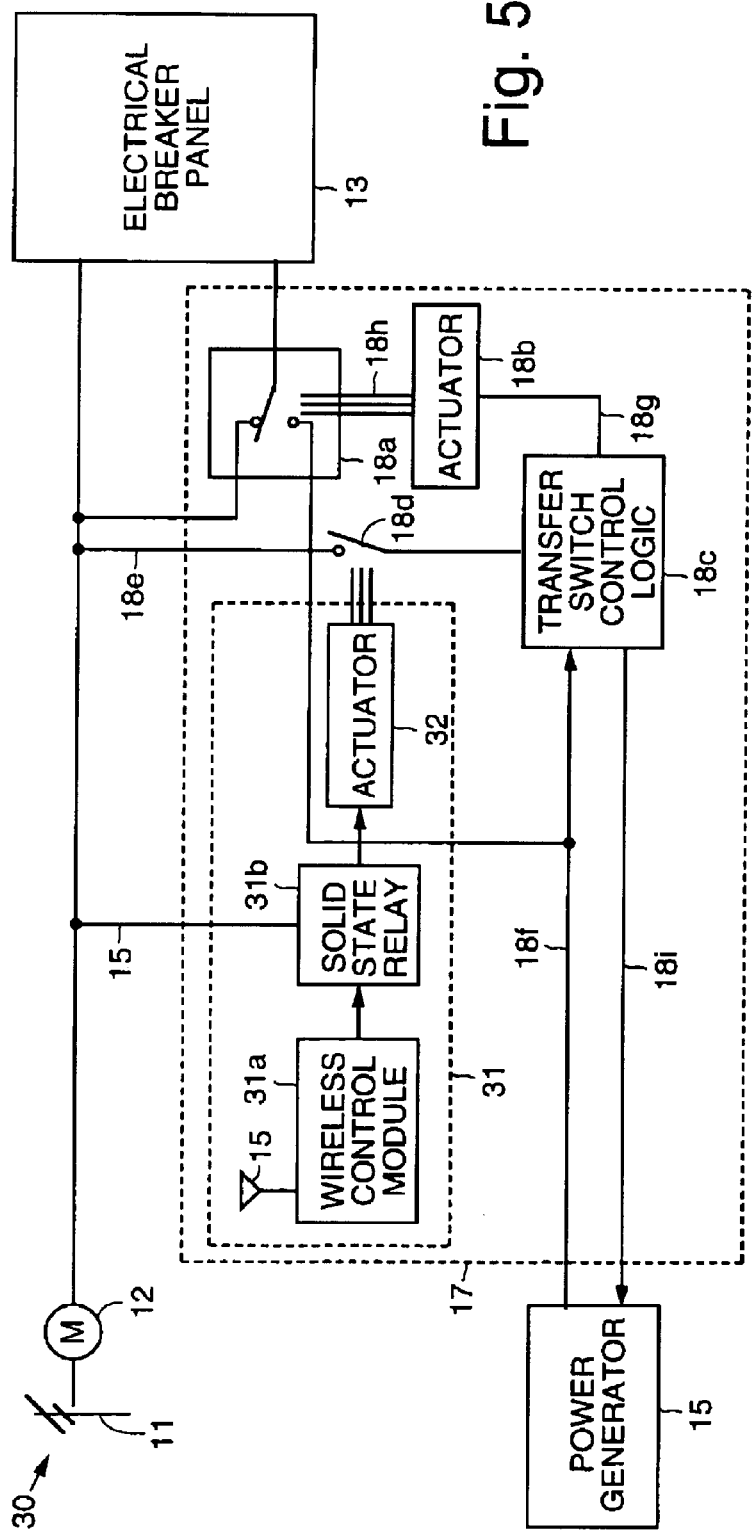
FIG. 5 illustrates a flow diagram of load reduction transfer switch control logic in accordance with the principles of the present invention.

FIG. 5 shows a schematic representation of the load reduction transfer switch 17 including a wireless load reduction control circuit 31 in accordance with the principles of the present invention. In this case, the wireless load reduction control circuit 31 receives a command via an antenna 31b and wireless control module 31a. The wireless control module 31a is coupled to a solid state relay 31c that is coupled to receive power from the primary utility source 11 and is coupled to a relay 32 or actuator 32.

Receipt of the command causes the solid state relay 31c to close. The solid state relay 31c connects utility power 11 to the relay 32 or actuator 32 that in turn breaks the connection of utility voltage to the transfer switch control circuit 16. The loss of the utility voltage to the transfer switch control circuit 16 initiates startup of the standby power generator 15 and transfer of power to the load reduction loads 14c. If utility power is absent, then the relay 32 or actuator 32 cannot be actuated, and it typically has a normally closed contact the keeps the transfer switch 16 from operating.

Figure 6:
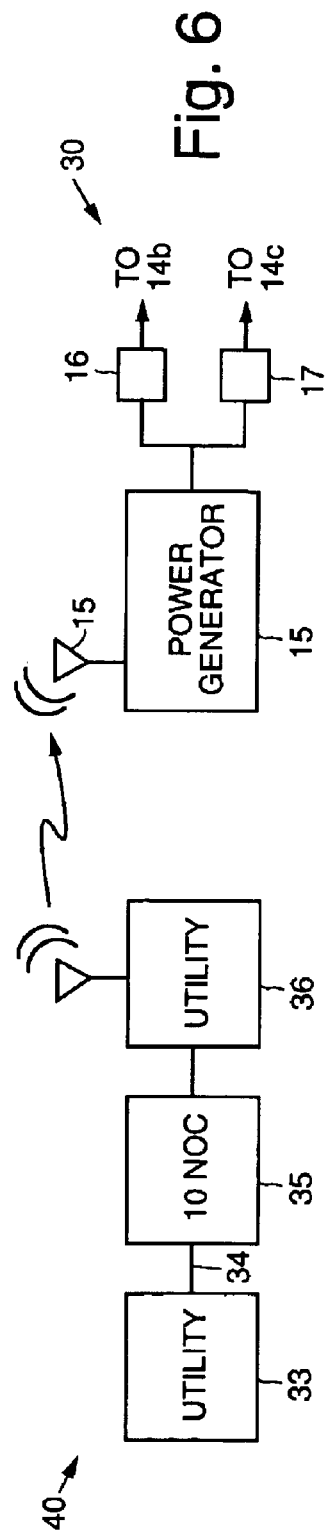
FIG. 6 illustrates a flow diagram illustrating a wireless control of a load reduction program, controlling multiple remote load reduction transfer switches in accordance with the principles of the present invention.

FIG. 6 illustrates a simple control system 40 and method wherein a utility 33 desiring to reduce loads 14 on its power grid sends a command message, typically by way of the Internet or a private network 34, to a Network Operations Center 35, where control of one or more wireless networks 36 are managed. The command message received from the utility 33 is processed into a data protocol that is appropriate for the communication channel that is used by the one or more wireless networks 36, and the message is transferred to wireless carrier(s) used in the one or more wireless networks 36. The command message is transmitted to appropriate geographic locations, and the message is received by one or more remote machines equipped with the present wireless load reduction control circuit 31 described above used to implement load reduction in accordance with the present invention.

It is possible for systems 30 implemented in accordance with the present invention to address individual wireless load reduction control circuits 31 or groups of wireless load reduction control circuits 31, depending on the application, and thus it is possible for a utility 33 to command an arbitrary number of wireless load reduction control circuits 31 or an arbitrary amount of load reduction virtually instantaneously. From the perspective of the utility 33, reduction of load 14 is equally important to production of additional utility power in terms of handling peak power shortages.

FIG. 7 is a flow diagram illustrating an exemplary method 50 in accordance with the principles of the present invention.

The exemplary method 50 implements load reduction and is used in a system 30 that supplies power from a primary power source 11 on a power grid to multiple sets of loads 14. The exemplary method 50 comprises the following steps.

A first transfer switch 16 is coupled 51 between one or more secondary power sources 15 and one or more corresponding subsets of critical loads 14. Each first transfer switch 16 is remotely controlled 52 to supply power from the associated secondary power source 15 to the corresponding subset of critical loads 14 if power from the primary power source 11 is unavailable. A remotely controllable load reduction transfer switch 17 is coupled 53 between each secondary power source 15 and a subset of load reduction loads 14c that are to be removed from the power grid during times requiring load reduction. Each load reduction transfer switch 17 is remotely controlled 54 to supply power from the secondary power source 15 to its corresponding subset of load reduction loads 14c in lieu of supplying power from the primary power source 11 only when power from the primary power source 11 is available and during times requiring load reduction.

In implementing the present invention, the load reduction transfer switch 17 may be installed in the same housing as a conventionally-used automatic transfer switch 16 in new equipment production. However, in retrofit applications, a separate secondary load reduction transfer switch 17 provides a simpler solution. In both cases, the load reduction transfer switch 17 and the automatic transfer switch 16 are connected in parallel to a utility power source 11, and the generator 15, or other secondary power source 15, and they both provide the switched power to appropriate loads 14; critical loads 14b are connected to the automatic transfer switch 16 and non-critical load reduction loads 14c are connected to the load reduction transfer switch 17.

In general, the transfer switches 16, 17 are wired so that the load reduction transfer switch 17 and automatic transfer switch 16 cannot both connect their loads 14c, 14b to the secondary generator 15 simultaneously, unless the secondary generator 15 is sized for this application. In general, the load reduction transfer switch 17 only operates when utility power is present and available, and the automatic transfer switch 16 only operates when the utility power is absent. This logic is consistent with the design of the secondary generator 15, the transfer switches 16, 17, and the chosen loads 14.

The wireless connection to the load reduction transfer switch 17 may be used to provide a logical command to the load reduction transfer switch 17 to initiate operation of the secondary generator 15 and to transfer power to the loads 14c when the secondary generator 15 has achieved stable operation. The application of the logic signal may be logically ANDed with a logic signal representing "utility grid power available". Thus, if the command is received and grid power is present, the command to the load reduction transfer switch 17 would be applied. If the command is received and no grid power is available, then the load reduction transfer switch 17 is not commanded into operation, because the secondary generator 15 may be in operation supporting critical loads 14b, and the critical loads 14b carry priority over load reduction requirements. At the end of the load reduction process, the transfer command logic signal is removed from the load reduction transfer switch 17, power from the secondary generator 15 is disconnected from the load reduction loads 14c, and utility power is restored to these loads 14c.

Prior to executing the transfer of loads 14 to the secondary generator 15, the control logic may provide a logic signal that "notifies" the loads 14 of an upcoming power disturbance during the transfer process. This allows the loads 14 to prepare for transition. For example, if the load 14 is an air conditioning system, the control logic may open a relay in the thermostat circuit, allowing air conditioning blowers and pumps to come to a halt under their standard timing. This avoids the likelihood of inducing power spikes into the equipment during the, transfer process.

In other situations, different warning signals might be used. In all cases, a time delay between the provision of the alert signal or contact opening and the power transfer is needed, and the controller or the wireless service can provide that delay to protect the loads from power glitches (and voltage spikes that come from connecting or disconnecting inductive loads).

These power quality problems at transfer time, especially in "open transition" transfer switches represent one of the primary impediments to the use of standby power generators 15 in load reduction programs. Thus, the potential for financial loss due to equipment damage by power surges may seem to be a greater risk than the value of the savings in power costs associated with the load reduction program incentives. Thus, the ability to "power down" loads prior to transfer is an important aspect of the present invention.

The present invention has been described in the context of wireless connectivity, but it is to be understood that wired connection may readily he implemented. The preference for wireless connections comes from the ability to command large numbers of remote machines simultaneously via wireless communication, while achieving this function with telephone line connections is difficult, slow, and expensive. Further, the ability to install the load reduction transfer switch 17 on existing secondary generators 15 without having to coordinate with local telephone providers is a major advantage of wireless connectivity. In order to match the wireless methods in the area of broadcast control of multiple machines, a wire line connection would typically have to be configured into a computer network connection, and this further adds to cost and complexity.

The above description presented a fairly simplistic description of the logic process of the transfer switch. In this description, the utility power is sensed directly, and is used directly to control relays. In some cases, however, the power is three phase, and/or high voltage, and that power is not used directly, but there is a transformer in between, and/or other circuitry is used to detect the presence or absence of power and to drive the relays. It is to be understood that the present invention may readily be used in three phase and high voltage systems, and would include a transformer, and/or other circuitry to detect the presence or absence of power and to drive the relays.

Furthermore, the controller 31 (the load reduction control circuit 31) may optionally measure the local load at the location of the electrical breaker panel 13, and automatically transfer load to the secondary generator 15 via the load reduction transfer switch 17 if customer demand approaches a threshold that would adversely affect the electricity bill. To implement this, the logic in the controller 31 includes a customer demand threshold, that, when reached, causes the controller 31 to switch the load reduction loads 14c to the secondary generator 15. Thus, the present invention not only provides for wired and wireless control of load switching, but also provides for automatic transfer of power to the secondary generator 15 if customer demand approaches a threshold that would increase a customer's bill.

In addition, the present invention, and in particular the load reduction transfer switch 17 and its control circuit 31, may be designed to know or sense the difference between power-out and peak power reduction needs, and automatically connect the proper load 14 to the secondary power source 15. In this situation, two load reduction transfer switches 17 may be included in one housing, in lieu of a second separate transfer switch 17. The use of a separate transfer switch 17 is designed for retrofit installation in deployed machinery. The use of a multiple-pole load reduction transfer switches 17 (where each transfer switch 17 has from 1–4 poles) may be used, which would most likely be manufactured and/or marketed by a transfer switch company. The above-described local measurement of power and automatic switching to reduce the need for utility power during high customer demand situations is addressed by this alternative embodiment of the present invention.

Thus, methods and apparatus have been disclosed that make existing standby power available for use in load reduction programs to assist utilities in avoiding power shortages and the resultant blackouts. It is to be understood that the described embodiments are merely illustrative of some of the many specific embodiments which represent applications of the principles of the present invention. Clearly, numerous and other arrangements can be readily devised by those skilled in the ant without departing from the scope of the invention.

What is claimed is:

1. Apparatus for connecting a secondary power source to electrical loads that are designated for removal from a primary power source during times requiring load reduction, comprising:
   an automatic transfer switch coupled between the primary power source and the electrical loads and between the secondary power source and the electrical loads;
   a remotely controllable secondary load reduction transfer switch coupled between the primary power source and the electrical loads and between the secondary power source and the electrical loads;
   logic that enables the remotely controllable secondary load reduction transfer switch to operate only when primary power is available and when commanded to do so; and
   a command process for sending a command for the remotely controllable secondary load reduction transfer switch that is transferred to the logic of the remotely controllable secondary load reduction transfer switch to cause it to connect the secondary power source to electrical loads coupled thereto that are designated for disconnection from the primary power source during times requiring load reduction.

2. The apparatus recited in claim 1 wherein the secondary power source comprises a standby power generator.

3. The apparatus recited in claim 1 wherein the remotely controllable secondary transfer switch is wirelessly controlled.

4. The apparatus recited in claim 1 wherein the command process substantially simultaneously commands a plurality of remotely controllable secondary load reduction transfer switches to cause them to connect a secondary power source to electrical loads coupled thereto that are designated for disconnection from the primary power source during times requiring load reduction.

5. The apparatus recited in claim 1 wherein the logic and command process are operative to locally measure the electrical load, and automatically transfer selected loads to the secondary power source via the secondary load reduction transfer switch if power demand approaches a threshold set by a user.

6. The apparatus recited in claim 1 which comprises a plurality of remotely controllable secondary load reduction transfer switches and logic that enables the plurality of remotely controllable secondary load reduction transfer switches.

7. An electrical power distribution system comprising:
   a primary power source;
   an electrical breaker panel that distributes power to a plurality of loads comprising non-critical loads, critical loads, and load reduction loads;
   a secondary power source;
   an automatic transfer switch for distributing power to the critical loads from the secondary power source if power is not available from the primary power source;
   a load reduction transfer switch, wired in parallel to the automatic transfer switch, for distributing power to the load reduction loads to reduce power demand on the primary power source.

8. The system recited in claim 7 wherein the automatic transfer switch is designed to connect its critical loads to the secondary power source only in the absence of power from the primary power source.

9. The system recited in claim 7 wherein the load reduction transfer switch is designed so that it cannot normally connect the standby power generator to the load reduction loads in the absence of power from the primary power source.

10. The system recited in claim 7 wherein operation of the automatic transfer switch and load reduction transfer switch are mutually exclusive.

11. The system recited in claim 7 wherein the load reduction transfer switch allows the secondary power source to power the load reduction loads while power from the primary power source is available, independently from the critical loads that are powered by the secondary power source in the case of loss of power from the primary power source.

12. The system recited in claim 7 wherein the automatic transfer switch includes control logic circuitry comprising:
   a two position contactor operative such that in one position, the breaker panel is connected to the primary power source, and in the other position, the breaker panel is connected to the secondary power source; and
   a transfer switch control circuit that (1) senses the presence or absence of voltage from primary power source, and if the voltage is lost, provides a start signal to the secondary power source, causing it to begin producing power, (2) monitors power produced by the secondary power source, and when a stable voltage and frequency are reached, initiates transfer of power to the loads from the primary power source to the secondary power source; and (3) selectively controls an actuator via a control signal to cause the power transfer from the primary power source to the secondary power source and vice-versa.

13. The system recited in claim 7 wherein the load reduction transfer switch includes control logic circuitry comprising:
   a two position contactor operative such that in one position, the breaker panel is connected to the primary power source, and in the other position, the breaker panel is connected to the secondary power source;
   a transfer switch control circuit that (1) senses the presence or absence of voltage from the primary power source, and if the voltage is lost, provides a start signal to the secondary power source, causing it to begin producing power, (2) monitors power produced by the secondary power source, and when a stable voltage and frequency are reached, initiates transfer of power to the loads from the primary power source to the secondary power source; and (3) selectively controls an actuator via a control signal to cause the power transfer from the primary power source to the secondary power source and vice-versa; and a load reduction control circuit for receiving a command that applies power from the primary power source to an actuator that breaks connection of the voltage to the transfer switch control circuit and initiates startup of the secondary power source, the transfer of power to the load reduction loads, and that keeps the transfer switch from operating if power from the primary power source is absent.

14. The system recited in claim 13 wherein the load reduction control circuit comprises a wireless load reduction control circuit.

15. The system recited in claim 7 wherein the load reduction transfer switch is operative to locally measure electrical load, and automatically transfer selected loads to the secondary power source via the load reduction transfer switch if power demand approaches a threshold.

16. The system recited in claim 7 which comprises a plurality of load reduction transfer switches that transfer selected loads to the secondary power source.

17. A method of providing load reduction in a system that supplies power from a primary power source to multiple sets of loads and supplies power from a secondary power source by way of a first transfer switches to a subset of critical loads if power from the primary power source is unavailable, the method comprising the steps of:

coupling a remotely controllable second transfer switch between the secondary power source and a subset of load reduction loads that are to be disconnected from the primary power source during times requiring load reduction; and remotely controlling the second load reduction transfer switch to supply power from the secondary power source to the subset of load reduction loads in lieu of supplying power from the primary power source when power from the primary power source is available and during times requiring load reduction.

18. The method recited in claim 17 wherein the step of remotely controlling the second load reduction transfer switch comprises the step of substantially simultaneously controlling a plurality of second load reduction transfer switches to cause them to connect one or more secondary power sources to one or more subsets of load reduction loads respectively coupled thereto that are designated for disconnection from the primary power source during times requiring load reduction.

19. A method of providing load reduction in a system that supplies power from a primary power source to multiple sets of loads, comprising the steps of:

coupling a first transfer switch between the primary power source and the loads, and between a secondary power source and a subset of critical loads;

coupling a remotely controllable second transfer switch between the primary power source and the loads, and between the secondary power source and a subset of load reduction loads that are to be removed from the power grid during times requiring load reduction;

remotely controlling the first transfer switch to supply power from the secondary power source to the subset of critical loads if power from the primary power source is unavailable; and remotely controlling the second load reduction transfer switch to supply power from the secondary power source to the subset of load reduction loads in lieu of supplying power from the primary power source thereto when power from the primary power source is available and during times requiring load reduction.

20. The method recited in claim 19 wherein the step of remotely controlling the second load reduction transfer switch comprises the step of substantially simultaneously controlling a plurality of second load reduction transfer switches to cause them to connect one or more secondary power sources to one or more subsets of load reduction loads respectively coupled thereto that are designated for disconnection from the primary power source during times requiring load reduction.

* * * * *